(12) United States Patent
Aksoy

(10) Patent No.: US 11,373,270 B1
(45) Date of Patent: Jun. 28, 2022

(54) AXIS BASED COMPRESSION FOR REMOTE RENDERING

(71) Applicant: Facebook Technologies, LLC, Menlo Park, CA (US)

(72) Inventor: Volga Aksoy, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/222,121

(22) Filed: Apr. 5, 2021

Related U.S. Application Data

(63) Continuation of application No. 16/579,017, filed on Sep. 23, 2019, now Pat. No. 10,970,811.

(51) Int. Cl.
*G06T 3/00* (2006.01)
*G06F 3/14* (2006.01)
*G06F 3/01* (2006.01)

(52) U.S. Cl.
CPC ............ *G06T 3/0012* (2013.01); *G06F 3/013* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 2018/0018018 A1 | 1/2018 | Klingstrom | |
| 2018/0350032 A1* | 12/2018 | Bastani | G06T 3/0093 |
| 2020/0051214 A1 | 2/2020 | Nallam | |
| 2020/0132996 A1 | 4/2020 | Yokota | |
| 2021/0142443 A1* | 5/2021 | Eble | H04N 21/816 |

OTHER PUBLICATIONS

Non-Final Office Action on U.S. Appl. No. 16/579,017 dated Sep. 25, 2020.
Notice of Allowance on U.S. Appl. No. 16/579,017 dated Dec. 9, 2020 (10 pages).

* cited by examiner

*Primary Examiner* — Vu Nguyen
(74) *Attorney, Agent, or Firm* — Foley & Lardner LLP

(57) ABSTRACT

Disclosed herein are related to a system and a method of remotely rendering an image. In one approach, a console device generates an image according to a gaze direction of a user of a head mounted display (HMD). In one aspect, the image includes a first area and a second area disposed along an axis, where the second area is located farther away from a foveated area of the image than the first area. In one aspect, the foveated area corresponds to the gaze direction of the user of the HMD. In one aspect, the console device compresses the image according to the axis, where the second area is compressed at a higher level than the first area. In one aspect, the compressed image is transmitted to the HMD. The HMD may decompress the compressed image according to the axis, and render the decompressed image.

20 Claims, 7 Drawing Sheets

AXIS BASED COMPRESSION FOR REMOTE RENDERING

CROSS-REFERENCE TO RELATED APPLICATION

This application claims the benefit of priority under 35 U.S.C. § 120 as a continuation of U.S. Non-Provisional patent application Ser. No. 16/579,017, filed on Sep. 23, 2019, the content of which is incorporated herein by reference in its entirety.

FIELD OF DISCLOSURE

The present disclosure is generally related to processing an image of a virtual space, including but not limited to performing compression, decompression, or a combination of compression and decompression based on axes to render an image of a virtual space.

BACKGROUND

Artificial reality such as a virtual reality (VR), an augmented reality (AR), or a mixed reality (MR) provides immersive experience to a user. In one example, a user wearing a head mounted display (HMD) can turn the user's head, and an image of a virtual object corresponding to a location of the HMD and a gaze direction of the user can be displayed on the HMD to allow the user to feel as if the user is moving within a space of an artificial reality (e.g., a VR space, an AR space, or a MR space).

In one implementation, an image of a virtual object is generated by a console communicatively coupled to the HMD. In one example, the HMD includes various sensors that detect a location of the HMD and a gaze direction of the user wearing the HMD, and transmits the detected location and gaze direction to the console device through a wired connection or a wireless connection. The console device can determine a user's view of the space of the artificial reality according to the detected location and gaze direction, and generate an image of the space of the artificial reality corresponding to the user's view. The console device can transmit the generated image to the HMD, by which the image of the space of the artificial reality corresponding to the user's view can be presented to the user. In one aspect, the process of detecting the location of the HMD and the gaze direction of the user wearing the HMD, and rendering the image to the user should be performed within a frame time (e.g., less than 11 ms).

Any latency between a movement of the user wearing the HMD and an image displayed corresponding to the user movement can cause judder, which may result in motion sickness and can degrade the user experience.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for remotely rendering an image of a virtual object in an artificial reality space (e.g., an AR space, a VR space, or a MR space) through use of axis based compression/decompression. In one approach, a console device generates an image according to a gaze direction of a user of a head mounted display (HMD). The image (e.g., image pixels) may be divided or partitioned into multiple areas or blocks according to axes (e.g., geometric lines at least some of which may be straight or non-straight), that may be compressed or distorted individually, in groups, or collectively. In one aspect, the image includes a first area and a second area disposed along an axis, where the second area is located farther away from a foveated area of the image than the first area. In some embodiments, an edge or boundary of the first area or of the second area may lie along the axis. In some embodiments, the axes are imaginary or virtual reference lines, and may not be visible to a user of the HMD. The axes may be straight lines or curved lines, or a combination thereof, and may be geometrically or mathematically defined or described. In one aspect, the foveated area corresponds to the gaze direction, area and/or point of the user of the HMD, and can represent one portion or point of a field of view (FOV) of the user in the artificial reality space. In one aspect, the console device compresses the image according to the axis, where the second area is compressed at a higher level than the first area. In one aspect, the console device transmits the compressed image to the HMD. The HMD may decompress the compressed image according to the axis, and render the decompressed image. In one example, the console device may generate a high quality image (e.g., 1920 by 1080 pixels), and compress edges or corners of the image (e.g., corresponding to peripheral portions of the user's FOV, which are less important to the user) at a higher level than a center or a foveated area of the image. Hence, communication bandwidth between the console device and the HMD can be reduced due to the compression, while preserving fidelity of a center or a foveated area of the image.

Figure 1:
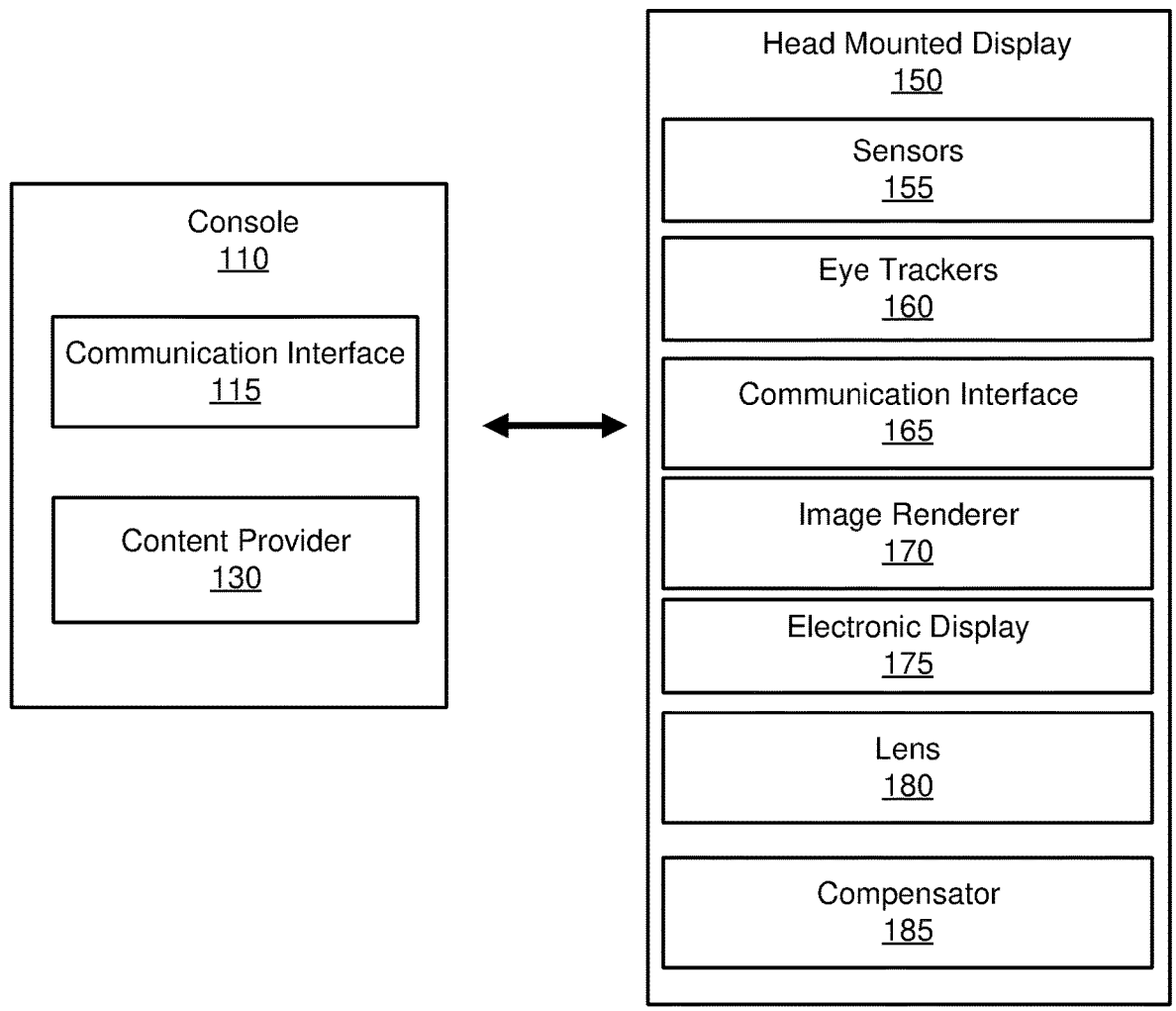
FIG. 1 is a diagram of a system environment including an artificial reality system, according to an example implementation of the present disclosure.

FIG. 1 is a block diagram of an example artificial reality system environment 100 in which a console 110 operates. In some embodiments, the artificial reality system environment 100 includes a HMD 150 worn by a user, and a console 110 providing content of artificial reality to the HMD 150. In one aspect, the HMD 150 may detect its location and a gaze direction of the user wearing the HMD 150, and provide the detected location and the gaze direction to the console 110. The console 110 may determine a view within the space of the artificial reality corresponding to the detected location and the gaze direction, and generate an image depicting the determined view. The console 110 may provide the image to HMD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HMD 150. For example, some of the functionality of the HMD 150 may be performed by the console 110. In some embodiments, the console 110 is integrated as part of the HMD 150.

In some embodiments, the HMD 150 is an electronic component that can be worn by a user and can present or provide an artificial reality experience to the user. The HMD 150 may render one or more images, video, audio, or some combination thereof to provide the artificial reality experience to the user. In some embodiments, audio is presented via an external device (e.g., speakers and/or headphones) that receives audio information from the HMD 150, the console 110, or both, and presents audio based on the audio information. In some embodiments, the HMD 150 includes sensors 155, eye trackers 160, a communication interface 165, an image renderer 170, an electronic display 175, a lens 180, and a compensator 185. These components may operate together to detect a location of the HMD 150 and a gaze direction of the user wearing the HMD 150, and render an image of a view within the artificial reality corresponding to the detected location of the HMD 150 and the gaze direction of the user. In other embodiments, the HMD 150 includes more, fewer, or different components than shown in FIG. 1.

In some embodiments, the sensors 155 include electronic components or a combination of electronic components and software components that detect a location and an orientation of the HMD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HMD 150. In one aspect, the sensors 155 can detect the translational movement and the rotational movement with respect to a previous orientation and location of the HMD 150, and determine a new orientation and/or location of the HMD 150 by accumulating or integrating the detected translational movement and/or the rotational movement. Assuming for an example that the HMD 150 is oriented in a direction 25 degrees from a reference direction, in response to detecting that the HMD 150 has rotated 20 degrees, the sensors 155 may determine that the HMD 150 now faces or is oriented in a direction 45 degrees from the reference direction. Assuming for another example that the HMD 150 was located two feet away from a reference point in a first direction, in response to detecting that the HMD 150 has moved three feet in a second direction, the sensors 155 may determine that the HMD 150 is now located at a vector multiplication of the two feet in the first direction and the three feet in the second direction.

In some embodiments, the eye trackers 160 include electronic components or a combination of electronic components and software components that determine a gaze direction of the user of the HMD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HMD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HMD 150. In some embodiments, the eye trackers 160 incorporate the orientation of the HMD 150 and the relative gaze direction with respect to the HMD 150 to determine a gate direction of the user. Assuming for an example that the HMD 150 is oriented at a direction 30 degrees from a reference direction, and the relative gaze direction of the HMD 150 is −10 degrees (or 350 degrees) with respect to the HMD 150, the eye trackers 160 may determine that the gaze direction of the user is 20 degrees from the reference direction. In some embodiments, a user of the HMD 150 can configure the HMD 150 (e.g., via user settings) to enable or disable the eye trackers 160. In some embodiments, a user of the HMD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head mounted display 175 are implemented on a single system, the communication interface 165 may communicate with the console 110 through a bus connection or a conductive trace. Through the communication link, the communication interface 165 may transmit to the console 110 data indicating the determined location of the HMD 150 and the determined gaze direction of the user. Moreover, through the communication link, the communication interface 165 may receive from the console 110 data indicating or corresponding to an image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. In one aspect, the image renderer 170 receives the compressed image from the console 110, and decompresses the compressed image, such that a communication bandwidth between the console 110 and the HMD 150 can be reduced. In one aspect, the image renderer 170 performs decompression according to axes of the compressed image indicating how to perform decompression, as described below with respect to FIGS. 4 and 7. In one aspect, the process of detecting, by the HMD 150, the location of the HMD 150 and the gaze direction of the user wearing the HMD 150, and generating and transmitting, by the console 110, a high resolution image (e.g., 1920 by 1080 pixels, or 2048 by 2048 pixels) corresponding to the detected location and the gaze direction to the HMD 150 may be computationally exhaustive and may not be performed within a frame time (e.g., less than 11 ms or 8 ms). In one aspect, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HMD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HMD 150. In one aspect, the console 110 includes a communication interface 115 and a content provider 130. These components may operate together to determine a view (e.g., a FOV of the user) of the artificial reality corresponding to the location of the HMD 150 and the gaze direction of the user of the HMD 150, and can generate an image of the artificial reality corresponding to the determined view. In other embodiments, the console 110 includes more, fewer, or different components than shown in FIG. 1. In some embodiments, the console 110 is integrated as part of the HMD 150.

In some embodiments, the communication interface 115 is an electronic component or a combination of an electronic component and a software component that communicates with the HMD 150. The communication interface 115 may be a counterpart component to the communication interface 165 to communicate with a communication interface 115 of the console 110 through a communication link (e.g., USB cable). Through the communication link, the communication interface 115 may receive from the HMD 150 data indicating the determined location of the HMD 150 and the determined gaze direction of the user. Moreover, through the communication link, the communication interface 115 may transmit to the HMD 150 data describing an image to be rendered.

The content provider 130 is a component that generates content to be rendered according to the location of the HMD 150 and the gaze direction of the user of the HMD 150. In one aspect, the content provider 130 determines a view of the artificial reality according to the location of the HMD 150 and the gaze direction of the user of the HMD 150. For example, the content provider 130 maps the location of the HMD 150 in a physical space to a location within a virtual space, and determines a view of the virtual space along the gaze direction from the mapped location in the virtual space. The content provider 130 may generate image data describing an image of the determined view of the virtual space, and transmit the image data to the HMD 150 through the communication interface 115. In some embodiments, the content provider 130 generates metadata including motion vector information, depth information, edge information, object information, etc., associated with the image, and transmits the metadata with the image data to the HMD 150 through the communication interface 115. The content provider 130 may compress and/or encode the data describing the image, and can transmit the compressed and/or encoded data to the HMD 150. In one aspect, the content provider 130 performs compression according to axes of the image, as described below with respect to FIGS. 3, 5A, 5B, and 6 for example. In some embodiments, the content provider 130 generates and provides the image to the HMD 150 periodically (e.g., every one second).

Figure 2:
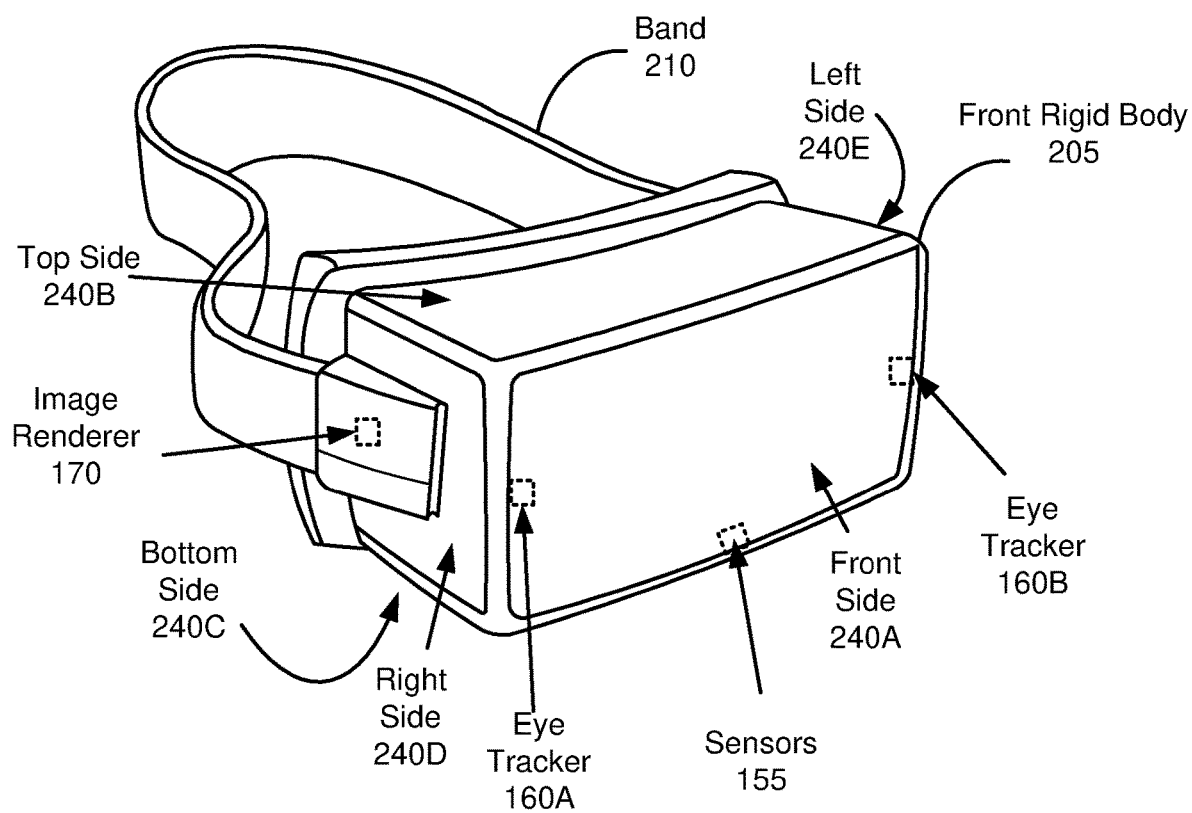
FIG. 2 is a diagram of a head mounted display, according to an example implementation of the present disclosure.

FIG. 2 is a diagram of a HMD 150, in accordance with an example embodiment. In some embodiments, the HMD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, and the image renderer 170. In the embodiment shown by FIG. 2, the sensors 155 are located within the front rigid body 205, and may not visible to the user. In other embodiments, the HMD 150 has a different configuration than shown in FIG. 2. For example, the image renderer 170, the eye trackers 160A, 160B, and/or the sensors 155 may be in different locations than shown in FIG. 2.

Figure 3:
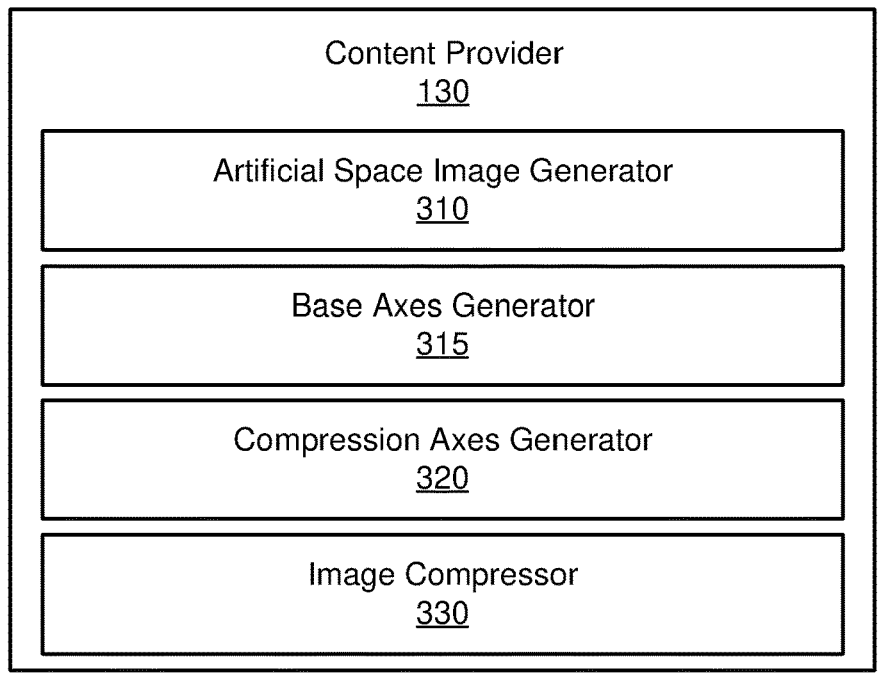
FIG. 3 is a diagram of a content provider, according to an example implementation of the present disclosure.

FIG. 3 is a diagram of the content provider 130, according to an example implementation of the present disclosure. In some embodiments, the content provider 130 includes an artificial space image generator 310, a base axes generator 315, a compression axes generator 320, and an image compressor 330. These components may generate an image of a view of an artificial reality, and compresses the image for transmission to the HMD 150 according to two or more axes. In some embodiments, the content provider 130 includes more, fewer, or different components than shown in FIG. 3. In some embodiments, functionalities of some components of the content provider 130 can be performed by the HMD 150.

In some embodiments, the artificial space image generator 310 includes a component that detects, estimates, or determines a view of the artificial reality corresponding to the location and/or orientation of the HMD 150, and/or the gaze direction of the user of the HMD 150, and generates an image of the artificial reality corresponding to the determined view. In one approach, the artificial space image generator 310 receives signals or data indicating the location of the HMD 150 and the gaze direction of the user of the HMD 150 from the HMD 150. The artificial space image generator 310 may map the location of the HMD 150 in a physical space to a location within the artificial space, and can determine a view of the artificial space along the gaze direction from the mapped location in the artificial space. In one approach, the artificial space image generator 310 may track a change in the location of the HMD 150 and the gaze direction of the user of the HMD 150, and update the previous view of the space of the artificial reality according to the tracked change to determine the current view of the artificial space. For example, if a user turns his head 45 degrees, then a view of the artificial space rotated 45 degrees from the previous view can be determined. For another example, if a user moves a step forward, then a view of the artificial space from a virtual location shifted from the previous location by a distance corresponding to the step can be determined. The artificial space image generator 310 may generate an image of the determined view of the artificial space.

In some embodiments, the base axes generator 315 includes a component that generates base axes for the image. In one aspect, the base axes can be straight or curved axes or lines, and can divide, segment or partition the image (e.g. image pixels) into multiple areas or blocks (sometimes referred to as segments). In some embodiments, at least some of the base axes are curved axes or lines (e.g., non-straight lines). The base axes can segment an image into segments, on which distortion or compression (e.g., radial barrel distortion, localized distortion, distributed distortion, symmetrical distortion, non-symmetrical distortion, irregular distortion, grid-based distortion) can be applied uniformly or non-uniformly within each segment, according to the axes (e.g., according to how the base axes and/or compression axes define, segment, divide and/or arrange the image into segments). In some embodiments, the base axes include horizontal base axes and vertical base axes that form a mesh. In one aspect, each horizontal base axis is separated from its adjacent horizontal base axis by a unit distance, and each vertical base axis is separated from its adjacent vertical base axis by a unit distance. In some embodiments, the base axes include diagonal base axes traversing the horizontal base axes and the vertical base axes at a slanted angle. In some embodiments, the diagonal base axis, a horizontal base axis and a vertical base axis intersect at a center of a foveated area. According to the base axes, compression or decompression can be performed.

In some embodiments, the compression axes generator 320 includes a component that generates compression information. In one aspect, the compression information indicates, describes, identifies and/or defines compression axes (and/or corresponding areas or blocks of the image, or how these blocks are segmented or defined) for compressing the image. The compression information can include or describe a relationship between an image (or block) prior to compression, and the image (or block) after compression. For example, the compression information can describe a compression ratio, e.g., for each block or image area. The compression information can describe the manner and/or extent of compression (e.g., vertical and/or horizontal compression, compression algorithm or method, compression axes, base axes, compression ratio/level) of a block.

In some embodiments, the compression axes are generated in a predetermined manner, or adaptively generated according to the foveated area. In some embodiments, the compression axes generator 320 modifies the base axes according to the foveated area to generate or obtain the compression axes. In one approach, the compression axes generator 320 determines, for a portion of a base axis between two intersecting base axes, a distance to the center or the foveated area, and reduces a length of the portion of the axis according to the determined distance. For example, the compression axes generator 320 determines, for a portion of a horizontal base axis between two adjacent vertical axes, a distance to the center or the foveated area, and adjusts or reduces (e.g., compresses) a length of the portion of the axis according to the distance to obtain a corresponding horizontal compression axis. For example, a length of a first portion of the base axis farther away from the center or the foveated area than a second portion of the base axis may be reduced by a larger amount than the second portion of the base axis. In one approach, the compression axes generator 320 determines, for different portions of a base axis, distances to the center or the foveated area, and adjusts lengths of different portions of the base axis according to the relative distances to the center or the foveated area to obtain compression axes. For example, a length of a portion of the base axis closest to the center or the foveated area may not be reduced, whereas a length of another portion of the base axis away from the center or the foveated area may be reduced according to a ratio between i) a distance from the portion of the base axis to the center or the foveated area and ii) a distance from the another portion of the base axis to the center or the foveated area.

In some embodiments, the compression axes generator 320 determines, for each base axis, a reference point and reduces or adjusts lengths of different portions of the base axis according to the reference point. In one aspect, a reference point of an axis is a point on the axis, through which an orthogonal line (or an intersecting axis) orthogonal to the axis from a center of the foveated area traverses. In one example, the compression axes generator 320 determines, for each portion of the axis between two corresponding intersecting axes, a distance to the reference point, and determines an amount to reduce the length of the portion according to the distance. The compression axes generator 320 may compare, for each distance, one or more predetermined thresholds, and determine an amount of length to reduce according to the comparison. For example, the compression axes generator 320 may determine that a first portion of a horizontal axis between two intersecting vertical axes is within a first predetermined threshold (e.g., 50 pixels in length), and determine not to reduce a length of the first portion. For another example, the compression axes generator 320 may determine that a second portion of the horizontal axis is between the first predetermined threshold and a second predetermined threshold (e.g., 100 pixels), and may determine to reduce a length of the second portion by a second amount (e.g., 10%). For another example, the compression axes generator 320 may determine that a third portion of the horizontal axis is between the second predetermined threshold and a third predetermined threshold (e.g., 150 pixels), and determine to reduce a length of the third portion by a third amount (e.g., 20%).

In some embodiments, the image compressor 330 includes a component that compresses the image from the artificial space image generator 310 according to the compression axes from the compression axes generator 320. In one aspect, the image compressor 330 compresses a rectangular image into another rectangular image, according to the compression axes. In one aspect, the image compressor 330 compresses an image (e.g., rectangular or non-rectangular image) into another image (e.g., rectangular or non-rectangular image), according to the compression axes. In some embodiments, at least some of the compression axes are curved axes or lines (e.g., non-straight lines), and the compression axes generator 320 can perform distortion or compression (e.g., radial barrel distortion, localized distortion, distributed distortion, symmetrical distortion, non-symmetrical distortion, irregular distortion, grid-based distortion) according to the curved axes (e.g., according to how the base axes and/or compression axes define, segment, divide and/or arrange the image into segments). For example, certain segments of the image are distorted or compressed differently as compared to some other segments of the image. In one approach, the image compressor 330 compresses a plurality of areas/blocks of the image defined by the base axes, to fit within corresponding spaces or areas defined by the compression axes. In one example, the image compressor 330 compares a length of a portion of a base axis with a length of a corresponding portion of a compression axis, and compresses an area along the base axis according to the comparison or a ratio between the length of the portion of the base axis and the length of the corresponding portion of the compression axis. In one aspect, the area is compressed along two intersecting axes in different amounts, according to distances along the intersecting axes from the area to the center or the foveated area. For example, the image compressor 330 compresses an area by a first amount along the vertical axis and compresses the area by a second amount along a horizontal axis. The image compressor 330 may transmit the compressed image and the compression information to the HMD 150 through the communication interface 115. Additional examples of compressions are provided below with respect to FIGS. 5A, 5B, and 6, for example.

Figure 4:
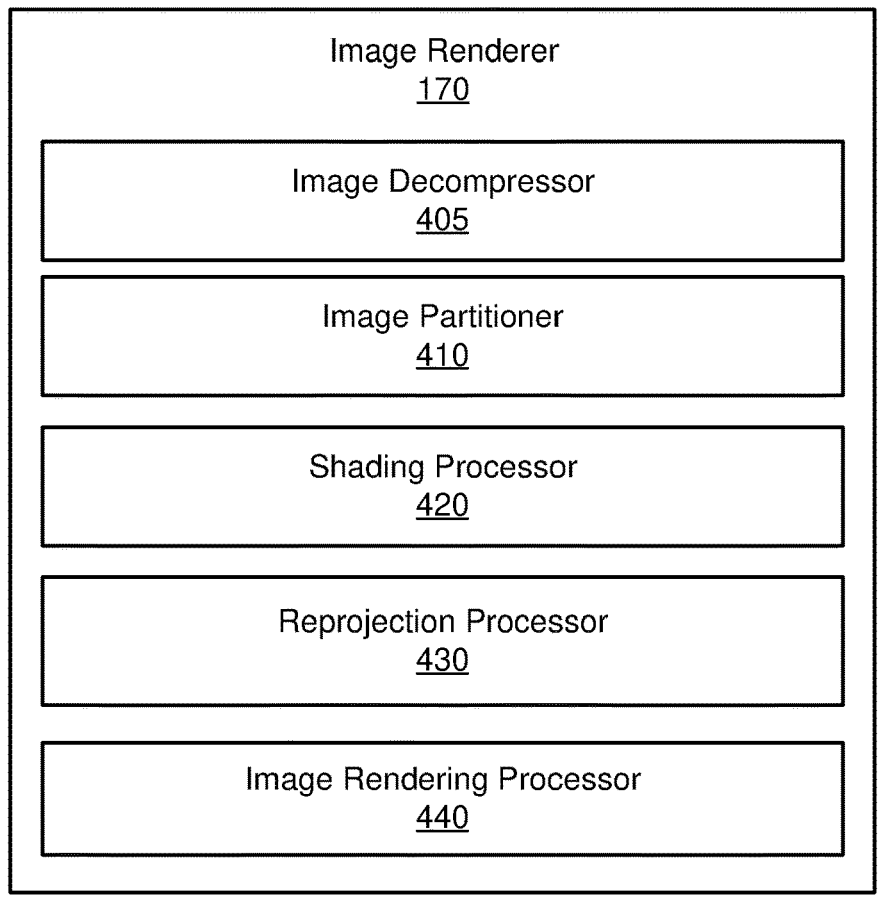
FIG. 4 is a diagram of an image renderer, according to an example implementation of the present disclosure.

FIG. 4 is a diagram of an image renderer 170, according to an example implementation of the present disclosure. In some embodiments, the image renderer 170 includes an image decompressor 405, an image partitioner 410, a shading processor 420, a reprojection processor 430, and an image rendering processor 440. These components may operate together to receive a compressed image from the console 110 through the communication interface 165, and can decompress the compressed image for rendering. In one aspect, these components may operate together to apply additional processes (e.g., a shading process, a reprojection process, compensation, predistortion, or any combination of them) for rendering. In other embodiments, the image renderer 170 includes more, fewer, or different components than shown in FIG. 4. In some embodiments, the image renderer 170 is designed and implemented to store or maintain a version (e.g., details) of the world view corresponding to the artificial reality, even the unrendered parts of the world view, in some embodiments. The image renderer 170 can access, apply and/or render the details of the world view, e.g., as predictions about the 3D space of the artificial reality, as these come into view of a user due to movement or interaction.

The image decompressor 405 may include a component that decompresses the compressed image from the console 110 according to compression axes. In some embodiments, the image decompressor 405 receives the compressed image and the compression information from the console 110 through the communication interface 165, and decompresses the compressed image according to the compression information. In one example, the compression information indicates or includes compression axes. In one aspect, the image decompressor 405 decompresses a rectangular image into another rectangular image, according to the compression axes. In one aspect, the image decompressor 405 receives, generates, or stores base axes of the image, and compares the base axes with the compression axes to decompress the compressed image. In one approach, the image decompressor 405 decompresses a plurality of areas of the image defined by the compression axes to fit within corresponding spaces or areas defined by base axes. In one example, the image decompressor 405 compares a length of a portion of a base axis with a length of a corresponding portion of a compression axis, and decompresses an area along the compression axis according to the comparison or a ratio between the length of the portion of the compression axis and the length of the corresponding portion of the base axis. In one aspect, the area is decompressed along two intersecting axes in different amounts, according to distances along the intersecting axes from the area to the center or the foveated area. For example, the image decompressor 405 decompresses an area by a first amount along the vertical axis and decompresses the area by a second amount along a horizontal axis.

The image partitioner 410 may include a component that determines different portions of an image to generate through a shading process and a reprojection, according to a change in a view of an artificial reality. In some embodiments, the image partitioner 410 determines or identifies different portions of the decompressed image from the image decompressor 405 to generate through the shading process and the reprojection process periodically at a refresh time (e.g., every one second). The refresh time may be predetermined or may be set according to a user input. In one approach, the image partitioner 410 determines the change in the view of the artificial reality, according to metadata associated with the image from the console 110. For example, the metadata can indicate or include depth information, motion vector information, and edge information. In one approach, the image partitioner 410 determines a portion of an image corresponding to motion vectors having amplitudes exceeding a predetermined threshold, and determines to generate that portion of the image through a shading process. In one approach, the image partitioner 410 determines a portion of the image with an amount of change in depth from its previous image exceeding a predetermined threshold, and may in response determine to generate that portion of the image through a shading process. In one approach, the image partitioner 410 determines a portion of the image corresponding to an edge of a virtual object, and may in response determine to generate that portion of the image through a shading process. The image partitioner 410 may aggregate or combine different portions determined according to motion vectors, depth and edges into a first portion of the image to generate through the shading process. The image partitioner 410 may determine to generate a remaining portion (or a second portion) of the image through a reprojection process. In one aspect, a shading process is computationally exhaustive. In one example, the image partitioner 410 determines to generate 15-20% of the image through a shading process, and determines to generate 80~85% of the image through a reprojection process to save computational resources and/or achieve bandwidth efficiency.

The shading processor 420 can correspond to a component that generates the first portion of the image through a shading process. In one approach, the shading processor 420 simulates light from a virtual light source projected on a virtual object and represents shading on one or more surfaces of the virtual object according to the light. For example, the shading is represented with different brightness or darkness, according to light from the virtual light source incident on one or more surfaces of the virtual object. In one approach, brightness or darkness is determined according to a normal vector of a surface of a virtual object with respect to the virtual light source and a distance of the surface of the virtual object from the light source to represent depth in a three dimensional space of the virtual object.

In some embodiments, the shading processor 420 adaptively adjusts a resolution of shadings performed. In one aspect, the shading processor 420 performs different levels of resolutions of shadings according to depth information, motion vector information, and edge information. In one aspect, the shading processor 420 determines, within the first portion of the image determined by the image partitioner 410, different areas to perform shading and corresponding levels of resolutions of shadings. For example, the shading processor 420 can perform the highest level of resolution of shading to generate a first area of the image with an edge of a virtual object within a foveated area to represent details of shadings, and perform a lower level of resolution of shading lower than the highest level to generate a second area that is adjacent to the first area away from the edge to represent lesser details of the shadings. In one approach, for different areas, different levels of resolutions of shading can be performed by changing sizes of tiles in different areas of the image. For example, a higher level of resolution of shading can be performed to generate an area of the image by decreasing a size of a tile or decreasing a number of pixels per tile in the area of the image such that finer details of shadings can be represented for the area of the image. Conversely, a lower level of resolution of shading can be performed to generate another area of the image by increasing a size of a tile or a number of pixels per tile in the another area of the image such that lesser details of shadings can be represented for the another area of the image. By performing different levels of resolutions of shadings to different areas, computational resources can be conserved by allocating less computational resources to perform a shading process with lower levels of resolutions to areas, in which the details of the shadings are less significant.

The reprojection processor 430 may include or correspond to a component that generates a second portion of the image determined by the image partitioner through a reprojection process. In some embodiments, the reprojection processor 430 determines a filtering, a resolution, a rate or a frequency of reprojection to be applied, according to a change in a view of the artificial reality space. In one approach, the reprojection processor 430 determines a rate of reprojection according to an amount of change in the view of the artificial reality space. The reprojection processor 430 may increase the rate of reprojection, in response to detecting that the amount of change in the view of the artificial reality space is less than a predetermined threshold amount. For example, if the motion vector in the second portion of the image is less than a predetermined threshold, or if the change in the depth of a virtual object in the second portion of the image is less than a predetermined threshold, then the reprojection processor 430 may increase the rate of reprojection. For example, if the motion vector in the second portion of the image exceeds a predetermined threshold or if the change in the depth of a virtual object in the second portion of the image exceeds a predetermined threshold, then the reprojection processor 430 may determine to apply a bicubic filtering for the reprojection. For example, the reprojection processor 430 can determine a first area within the second portion of the image farthest away from the first portion of the image to generate through the shading process, and determine to perform the lowest level of resolution of reprojection to generate the first area. For another example, the reprojection processor 430 can determine a second area within the second portion of the image adjacent to the first area closer to the first portion of the image to generate through the shading process, and determine to perform a higher level of resolution of reprojection higher than the lowest level of resolution to generate the second area. The reprojection processor 430 may perform reprojection according to the determined filtering type, reprojection rate, and/or resolution.

The image rendering processor 440 can include or correspond to a component that generates an image to render according to the shading process performed by the shading processor 420 and the reprojection process performed by the reprojection processor 430. In one aspect, the image rendering processor 440 combines the first portion of the image generated by the shading processor 420 and the second portion of the image generated by the reprojection processor 430 to generate the image to be rendered. The image rendering processor 440 may provide the combined image to the electronic display 175 for presentation. In some embodiments, the image generated by the image rendering processor 440 may be processed or compensated by the compensator 185 to correct for optical aberrations or distortions.

Figure 5A:
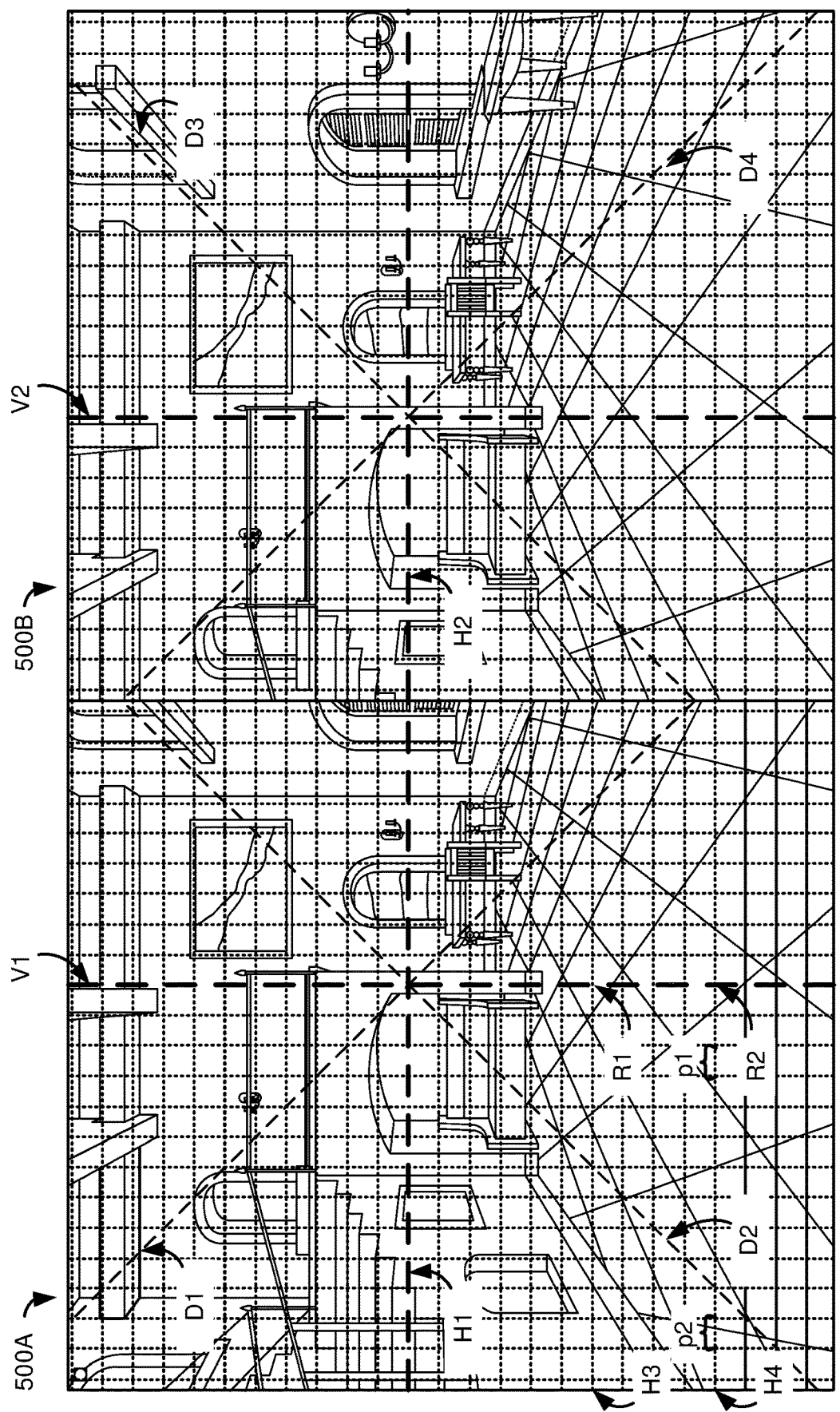
FIG. 5A shows example images of a virtual reality before an axis based compression, according to an example implementation of the present disclosure.

FIG. 5A shows example images 500A, 500B of a virtual reality before an axis based compression is applied, according to an example implementation of the present disclosure. The image 500A corresponds to a left eye view of an artificial reality, and the image 500B corresponds to a right eye view of the artificial reality, for example. In one example, the artificial space image generator 310 generates the images 500A, 500B according to the location of the HMD 150 and the gaze direction of a user of the HMD 150. The base axes generator 315 may generate base axes including horizontal axes, vertical axes, and diagonal axes. In one example, a horizontal axis H1, a vertical axis V1 and two diagonal axes D1, D2 may intersect with each other at or near a foveated area for a left eye view of the artificial reality. Similarly, in one example, a horizontal axis H2, a vertical axis V2 and two diagonal axes D3, D4 may intersect with each other at or near a foveated area for a right eye view of the artificial reality.

Figure 5B:
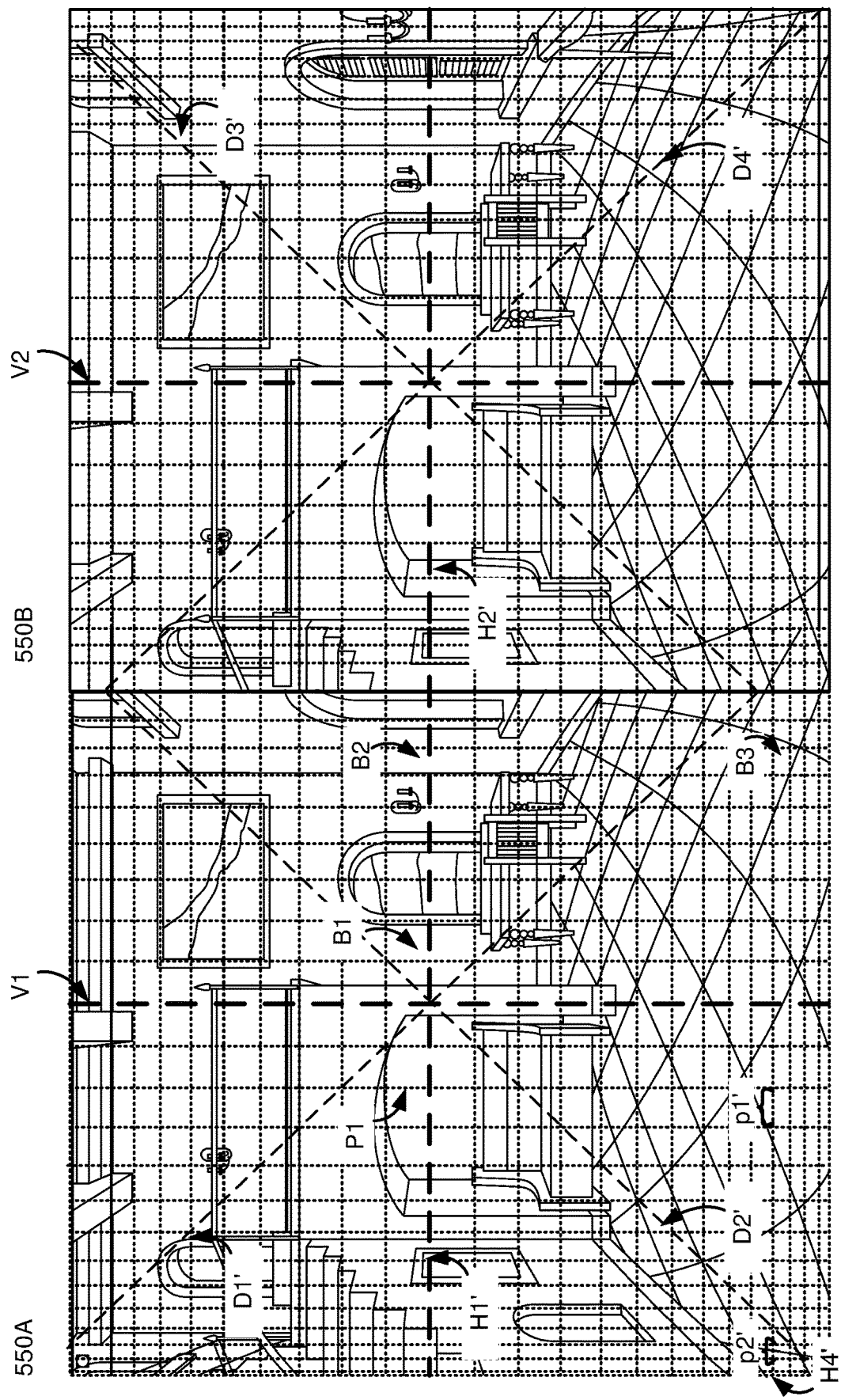
FIG. 5B shows example images of virtual reality after the axis based compression, according to an example implementation of the present disclosure.

FIG. 5B shows example compressed images 550A, 550B of a virtual reality after axis based compression is applied, according to an example implementation of the present disclosure. In one example, the compression axes generator 320 may generate compression axes based on the base axes, and compresses the images 500A, 500B to generate the compressed images 550A, 550B. In one example, a horizontal axis H1', a vertical axis V1' and two diagonal axes D1', D2' may intersect with each other at or near a foveated area for a left eye. Similarly, in one example, a horizontal axis H2', a vertical axis V2' and two diagonal axes D3', D4' may intersect with each other at or near a foveated area for a right eye. In one aspect, the compression axes are generated such that a distance between two adjacent compression axes are reduced or adjusted according to a distance from the foveated area. For example, a distance between two vertical axes near a left vertical side of the compressed image 550A is smaller than a distance between two vertical axes near the foveated area. For another example, a distance between two horizontal axes near a top horizontal side of the compressed image 550A is smaller than a distance between two horizontal axes near the foveated area. In one example, a first area B1 closer to the foveated area than a second area B2 along the compression axis H1' has a longer length along the compression axis H1' than the second area B2, but the first area B1 and the second area B2 have a same height. In one example, the second area B2 closer to the foveated area than a third area B3 along a vertical compression axis has a longer height along the vertical compression axis than the third area B3, but the second area B2 and the third area B3 have a same length. Hence, a portion of the image near the foveated area is preserved, while another portion of the image away from the foveated area is compressed. Accordingly, communication bandwidth for transmitting and receiving the compressed image 550A, 550B can be reduced, without losing or sacrificing fidelity of information (e.g., that may matter more to the user) near the foveated area.

In some embodiments, the compression axes generator 320 determines, for each base axis, a reference point and reduces or adjusts lengths of different portions of the base axis according to the reference point. In one aspect, a reference point of an axis is a point on the axis, through which an orthogonal line (or an intersecting axis) orthogonal to the axis from a center of the foveated area traverses. For example, a horizontal base axis H3 has a reference point R1, and a horizontal base axis H4 has a reference point R2 that are intersected by the vertical base axis V1 through the center of the foveated area. In one example, the compression axes generator 320 determines that a distance of a first portion p1 of the horizontal base axis H4 to the reference point R2 is within a first predetermined threshold, and does not reduce a length of the portion p1 of the horizontal base axis H4 to generate a corresponding portion p1' of the compression axis H4'. In one example, the compression axes generator 320 determines that a distance of a second portion p2 of the horizontal base axis H4 to the reference point R2 is between a second predetermined threshold and a third predetermined threshold, and reduces a length of the portion p2 of the horizontal base axis H4 by 50% to generate a corresponding portion p2' of the compression axis H4'. In one aspect, the horizontal compression axes have the same length, and the vertical compression axes have the same height, such that the compressed images 550A, 550B generated according to the compression axes have a rectangular shape as shown in FIG. 5B.

Figure 6:
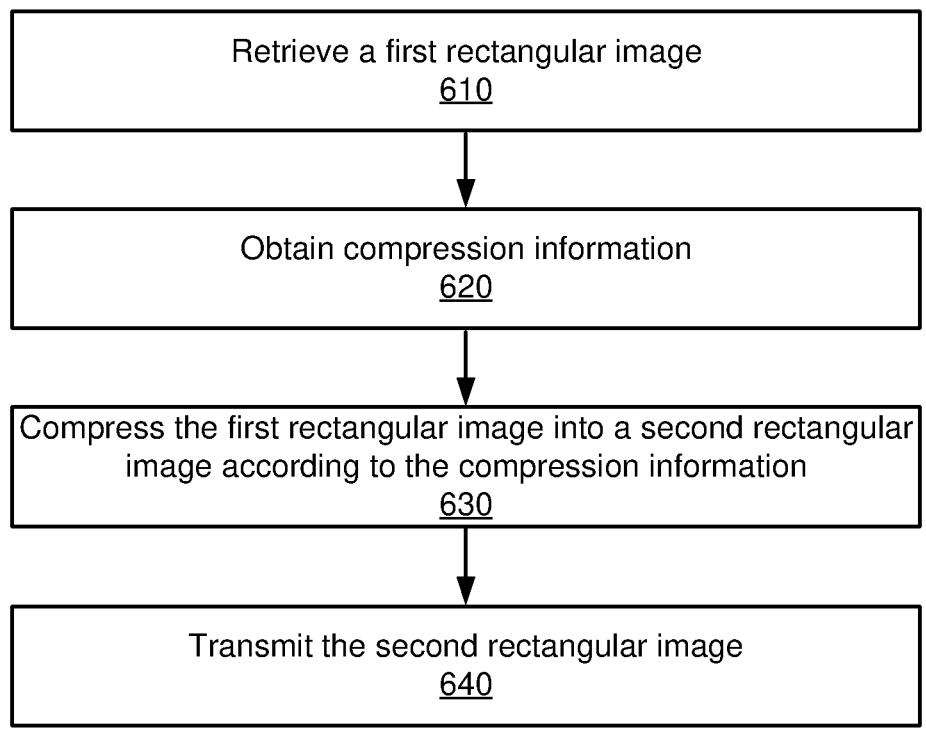
FIG. 6 is a flow chart illustrating a process of performing axis based compression, according to an example implementation of the present disclosure.

FIG. 6 is a flow chart illustrating a process 600 of performing axis based compression, according to an example implementation of the present disclosure. In some embodiments, the process 600 is performed by the console 110. In some embodiments, the process 600 is performed by other entities. In some embodiments, the process 600 includes more, fewer, or different steps than shown in FIG. 6.

In one approach, the console 110 retrieves 610 a first rectangular image. In one approach, the console 110 receives signals indicating the location of the HMD 150 and the gaze direction of the user of the HMD 150 from the HMD 150. The console 110 may map the location of the HMD 150 in a physical space to a location within the artificial space, and determine a view of the artificial space along the gaze direction from the mapped location in the artificial space. In one approach, the console 110 may track a change in the location of the HMD 150 and the gaze direction of the user of the HMD 150, and update the previous view of the space of the artificial reality according to the tracked change to determine the current view of the artificial space. The console 110 may generate an image of the determined view of the artificial space.

In one approach, the console 110 obtains 620 compression axes for compressing the image. The compression axes may be generated in a predetermined manner, or adaptively generated according to the foveated area of the image. In one approach, the console 110 generates base axes dividing the image into multiple areas or blocks, then modifies or adjusts the base axes to generate or obtain the compression axes for compressing the image. In some embodiments, the base axes include horizontal base axes and vertical base axes that form a mesh. In one aspect, each horizontal base axis is separated from its adjacent horizontal base axis by a unit distance, and each vertical base axis is separated from its adjacent vertical base axis by a unit distance. In some embodiments, the base axes include diagonal base axes traversing the horizontal base axes and the vertical base axes at a slanted angle. In some embodiments, the console 110 modifies the base axes according to the foveated area to generate or obtain the compression axes. In one approach, the console 110 determines, for a portion of a base axis between two intersecting base axes, a distance to the center or the foveated area, and adjusts or reduces a length of the portion of the axis according to the determined distance. For example, the console 110 determines, for a portion of a horizontal base axis between two adjacent vertical axes, a distance to the center or the foveated area, and adjusts or reduces a length of the portion of the axis according to the distance to obtain a corresponding horizontal compression axis.

In one approach, the console 110 compresses 630 the first rectangular image into a second rectangular image according to axes. In one approach, the console 110 compresses a plurality of areas or blocks of the image defined by the base axes to fit within corresponding spaces or areas defined by compression axes. In one example, the console 110 compares a length of a portion of a base axis with a length of a corresponding portion of a compression axis, and compresses an area along the base axis according to the comparison or a ratio between the length of the portion of the base axis and the length of the corresponding portion of the compression axis. In one aspect, the area is compressed along two intersecting axes in different amounts, according to distances along the intersecting axes from the area to the center or the foveated area. For example, the console 110 compresses an area by a first amount (e.g., 50%) along the vertical axis and compresses the area by a second amount (e.g., 80%) along a horizontal axis, according to a location of the area with respect to foveated area.

In one approach, the console 110 transmits 640 the second rectangular image through a wireless or a wired connection (e.g., USB cable). Advantageously, by compressing the image through compression axes as disclosed herein, communication bandwidth between the console 110 and the HMD 150 can be reduced, while preserving fidelity of a center or a foveated area of the image.

Figure 7:
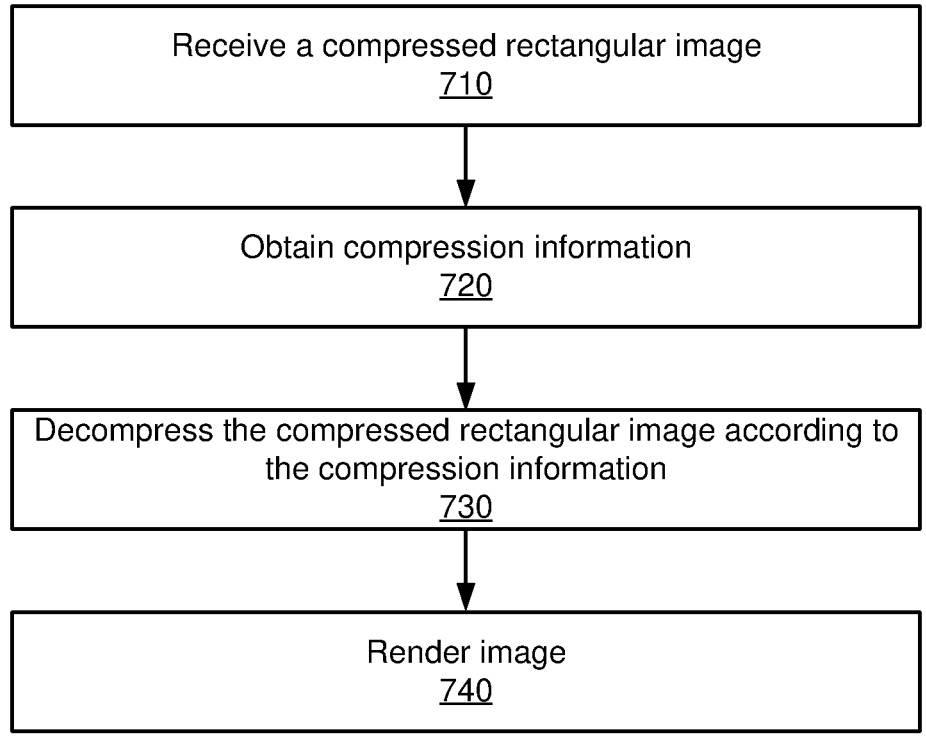
FIG. 7 is a flow chart illustrating a process of rendering an image based on axis based decompression, according to an example implementation of the present disclosure.

FIG. 7 is a flow chart illustrating a process of rendering an image based on axis based decompression, according to an example implementation of the present disclosure. In some embodiments, the process 700 is performed by the HMD 150. In some embodiments, the process 700 is performed by other entities. In some embodiments, the process 700 includes more, fewer, or different steps than shown in FIG. 7.

In one approach, the HMD 150 retrieves 710 a compressed rectangular image. In one approach, the HMD 150 obtains 720 compression information. In one example, the compression information indicates or includes compression axes (and/or provides an indication of blocks of the compressed rectangular image to be decompressed, and/or information for performing decompression of the blocks). In one approach, the HMD 150 may receive the compressed image and the compression information from the console 110 together. In one approach, the compression information may be predetermined, and the HMD 150 may generate and store the compression information prior to receiving the compressed image from the console 110.

In one approach, the HMD 150 decompresses 730 the compressed rectangular image according to the compression information. In one aspect, the HMD 150 decompresses a rectangular image into another rectangular image, according to the compression axes. In one approach, the HMD 150 decompresses a plurality of areas or blocks of the image defined by the compression axes to fit within corresponding spaces or areas defined by base axes. In one example, the HMD 150 receives, generates, and/or stores base axes of the image, and compares the base axes with the compression axes to decompress the compressed image. In one example, the HMD 150 compares a length of a portion of a base axis with a length of a corresponding portion of a compression axis, and decompresses an area along the compression axis according to the comparison or a ratio between the length of the portion of the compression axis and the length of the corresponding portion of the base axis. In one aspect, the area is decompressed along two intersecting axes in different amounts, according to distances along the intersecting axes from the area to the center or the foveated area. For example, the image decompressor 405 decompresses an area by a first amount (e.g., 200%) along the vertical axis and decompresses the area by a second amount (e.g., 125%) along a horizontal axis, according to a location of the area with respect to the foveated area.

In one approach, the HMD 150 renders 740 the image. In one example, the HMD 150 applies processes (e.g., shading process, reprojection process) to the decompressed image, and renders the process image. In one example, the HMD 150 may apply compensation or predistortion to correct for optical aberrations or distortions due to the lens of the HMD 150, and renders the image according to the compensation.

Figure 8:
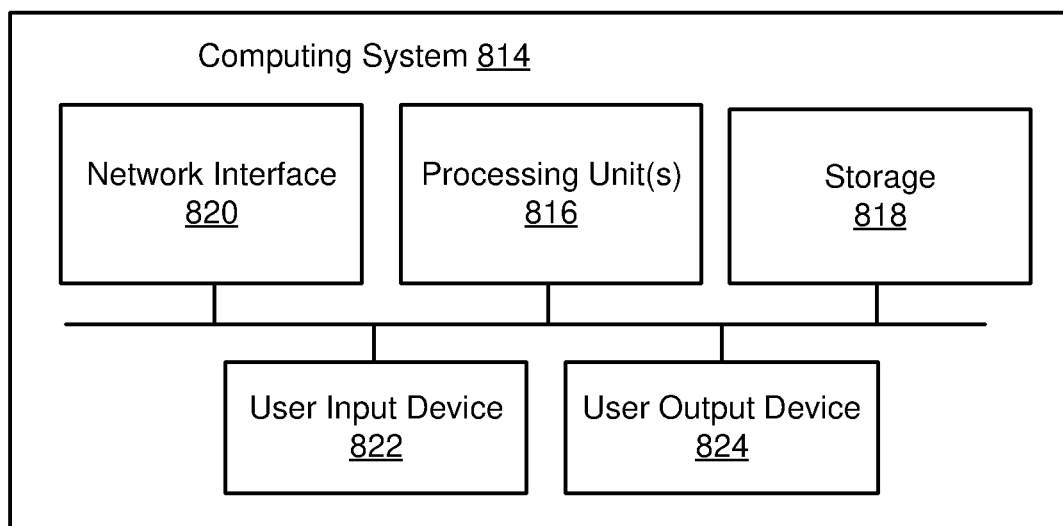
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110, the HMD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
at least one processor configured to:
receive, from another device through a communication link, a compressed image, the compressed image including a first set of areas allocated by a first set of non-uniformly spaced axes and a second set of non-uniformly spaced axes intersecting the first set of non-uniformly spaced axes, the first set of areas including a first area and a second area, along an axis of the first set of non-uniformly spaced axes, the second area located farther away from a foveated area of the compressed image than the first area,
modify the compressed image to obtain a modified image by decompressing the compressed image according to compression information indicating the first set of non-uniformly spaced axes and the second set of non-uniformly spaced axes, the modified image including a second set of areas allocated by a third set of uniformly spaced axes and a fourth set of uniformly spaced axes intersecting the third set of uniformly spaced axes, the second area decompressed at a higher level than the first area, and
render the modified image to a user of the device.

2. The device of claim 1, wherein the at least one processor is configured to detect a gaze direction of the user, wherein the foveated area corresponds to the gaze direction of the user.

3. The device of claim 1, wherein the axis is parallel to a horizontal side of the compressed image, or is parallel to a vertical side of the compressed image.

4. The device of claim 1, wherein the second area has a smaller size than the first area, wherein the decompressed second area and the decompressed first area have a same size.

5. The device of claim 1, wherein each of the third set of uniformly spaced axes corresponds to a respective one of the first set of non-uniformly spaced axes, and wherein each of the fourth set of uniformly spaced axes corresponds to a respective one of the second set of non-uniformly spaced axes.

6. The device of claim 1, wherein the at least one processor is configured to apply a predistortion to the decompressed image to correct for a distortion due to a lens of the device.

7. The device of claim 1, wherein the at least one processor is configured to receive the compression information with the compressed image.

8. The device of claim 1, wherein the at least one processor is configured to store the compression information prior to receiving the compressed image.

9. The device of claim 1, wherein the at least one processor is configured to:
compare a length of a portion of the axis with a length of a corresponding portion of another axis,
determine a ratio between the length of the portion of the axis and the length of the corresponding portion of the another axis, and
modify the compressed image by decompressing the compressed image according to the determined ratio.

10. A method comprising:
receiving, by a device from another device through a communication link, a compressed image, the compressed image including a first set of areas allocated by a first set of non-uniformly spaced axes and a second set of non-uniformly spaced axes intersecting the first set of non-uniformly spaced axes, the first set of areas including a first area and a second area, along an axis of the first set of non-uniformly spaced axes, the second area located farther away from a foveated area of the compressed image than the first area;
modifying, by the device, the compressed image to obtain a modified image by decompressing the compressed image according to compression information indicating the first set of non-uniformly spaced axes and the second set of non-uniformly spaced axes, the modified image including a second set of areas allocated by a third set of uniformly spaced axes and a fourth set of uniformly spaced axes intersecting the third set of uniformly spaced axes, the second area decompressed at a higher level than the first area; and rendering the modified image to a user of the device.

11. The method of claim 10, comprising:

detecting a gaze direction of the user, wherein the foveated area corresponds to the gaze direction of the user.

12. The method of claim 10, wherein the axis is parallel to a horizontal side of the compressed image, or is parallel to a vertical side of the compressed image.

13. The method of claim 10, wherein the second area has a smaller size than the first area, wherein the decompressed second area and the decompressed first area have a same size.

14. The method of claim 10, wherein each of the third set of uniformly spaced axes corresponds to a respective one of the first set of non-uniformly spaced axes, and wherein each of the fourth set of uniformly spaced axes corresponds to a respective one of the second set of non-uniformly spaced axes.

15. The method of claim 10, comprising:

applying a predistortion to the decompressed image to correct for a distortion due to a lens of the device.

16. The method of claim 10, comprising:

receiving the compression information with the compressed image.

17. The method of claim 10, comprising:

storing the compression information prior to receiving the compressed image.

18. The method of claim 10, comprising:

comparing a length of a portion of the axis with a length of a corresponding portion of another axis;

determining a ratio between the length of the portion of the axis and the length of the corresponding portion of the another axis; and modifying the compressed image by decompressing the compressed image according to the determined ratio.

19. A non-transitory computer readable medium storing program instructions for causing at least one processor of a device to implement operations of:

receiving, from another device through a communication link, a compressed image, the compressed image including a first set of areas allocated by a first set of non-uniformly spaced axes and a second set of non-uniformly spaced axes intersecting the first set of non-uniformly spaced axes, the first set of areas including a first area and a second area, along an axis of the first set of non-uniformly spaced axes, the second area located farther away from a foveated area of the compressed image than the first area, modifying the compressed image to obtain a modified image by decompressing the compressed image according to compression information indicating the first set of non-uniformly spaced axes and the second set of non-uniformly spaced axes, the modified image including a second set of areas allocated by a third set of uniformly spaced axes and a fourth set of uniformly spaced axes intersecting the third set of uniformly spaced axes, the second area decompressed at a higher level than the first area, and rendering the modified image to a user of the device.

20. The non-transitory computer readable medium of claim 19, wherein the second area has a smaller size than the first area, wherein the decompressed second area and the decompressed first area have a same size.

* * * * *